United States Patent [19]
McGuigan

[11] Patent Number: 5,918,271
[45] Date of Patent: Jun. 29, 1999

[54] PIPE LEAK LOCATION DETECTING APPARATUS AND REPAIR METHOD

[76] Inventor: James DeTurck McGuigan, 1218 Caln Meeting House Rd., Coatesville, Pa. 19320

[21] Appl. No.: 09/022,269

[22] Filed: Feb. 11, 1998

[51] Int. Cl.[6] .................................................. G01M 3/08
[52] U.S. Cl. ........................ 73/49.1; 73/40.5 R; 73/37.9
[58] Field of Search .................. 73/49.1, 40, 40.5 T, 73/40.5 R, 37.9, 37, 49.8; 137/556

[56] References Cited

U.S. PATENT DOCUMENTS

| | | | |
|---|---|---|---|
| Re. 33,160 | 2/1990 | Guthrie et al. ................... | 73/40.5 R |
| D. 353,487 | 12/1994 | Smith ................................ | D3/304 |
| 1,001,273 | 8/1911 | Ingraham .......................... | 52/294 |
| 2,414,310 | 1/1947 | Laird ................................. | 25/154 |
| 3,195,236 | 7/1965 | Green et al. ..................... | 33/141 |
| 3,199,598 | 8/1965 | Loomis ............................. | 166/147 |
| 3,511,003 | 5/1970 | Alleaume ......................... | 52/198 |
| 3,640,038 | 2/1972 | Heron ............................... | 52/224 |
| 3,682,198 | 8/1972 | Davis et al. ..................... | 137/625.43 |
| 3,903,730 | 9/1975 | Matthews, Jr. et al. .......... | 73/40.5 |
| 4,038,795 | 8/1977 | Abrams ............................ | 52/169 |
| 4,134,290 | 1/1979 | Bauerle ........................... | 73/40.5 R |
| 4,311,556 | 1/1982 | Iwamoto et al. ................. | 376/249 |
| 4,413,653 | 11/1983 | Carter, Jr. ....................... | 138/89 |
| 4,651,558 | 3/1987 | Martin et al. .................... | 73/40.5 R |
| 4,655,367 | 4/1987 | Palazzo ............................ | 220/445 |
| 4,890,483 | 1/1990 | Vetter ............................... | 73/40.5 R |
| 5,259,895 | 11/1993 | Sharp ................................ | 156/69 |
| 5,356,029 | 10/1994 | Hogan .............................. | 220/465 |
| 5,402,915 | 4/1995 | Hogan .............................. | 222/105 |
| 5,435,405 | 7/1995 | Schempf et al. ................. | 180/9.1 |
| 5,468,089 | 11/1995 | Claude et al. ................... | 405/52 |

*Primary Examiner*—Richard Chilcot
*Assistant Examiner*—J David Wiggins
*Attorney, Agent, or Firm*—John D. Gugliotta

[57] ABSTRACT

An apparatus that allows for the testing of pipes, either underground or in other inaccessible locations, for leaks and determines the exact locations and severity of said leaks. By the use of a ball, attached to a retaining string, traveling through a piping system on the flow of liquid that is exiting through the pipe leak, a user is capable of determining the location of the leak within inches, even on long line piping systems. The invention utilizes a reservoir of liquid that is forced through the pipe under test using a pump. A calibrated reel of retaining string then provides the exact location of the leak. The pump to give forward movement to a fluid-driven ball being propelled along a pipe section while such pipe section is closed off at its distant end to form a no-flow condition and reservoir alone then allow the user to determine the severity of the leak as well as the option of repairing the leak from inside of said piping system from the remote location by use of a sealing compound mixed with water.

8 Claims, 4 Drawing Sheets

PIPE LEAK LOCATION DETECTING APPARATUS AND REPAIR METHOD

BACKGROUND OF THE INVENTION

1. Field of the Invention

The present invention relates generally to pipe failure identification means and, more particularly, to a pipe leak location detecting apparatus and repair method.

2. Description of the Related Art

In the related art, numerous attempts have been made to help an individual identify the exact location of a pipe leak. These improvements have ranged from simple electrical sensors that test for the presence of a liquid on the exterior of a pipe to complex mechanical and electrical systems utilizing television cameras, pressure transducers, electronic control systems and the like. A search of the prior art did not disclose any patents that read directly on the claims of the instant invention; however, the following references were considered related:

| U.S. Pat. No. | Inventor | Issue Date |
| --- | --- | --- |
| 5,467,640 | Joe Salinas | Nov. 21, 1995 |
| 5,440,917 | Glenn Smith, et al. | Aug. 15, 1995 |
| 5,372,032 | Ernest Filippi, et al. | Dec. 13, 1994 |
| 5,190,069 | Raymond Richards | Mar. 2, 1993 |

The previous art consists of several devices in which aid the user in determining if a fixed length of pipe is experiencing a leak. These devices, however, have one or more of the following problems.

First, the devices can be complex, and therefore, expensive to manufacture. The public is less likely to purchase an expensive pipe leak location detecting apparatus and repair method.

Second, some of the previous devices rely on a trial and error method for the location of the leaks by narrowing the search down on each consecutive test and thus requires excessive time in determining the location of the search.

Third, all of the above devices require a source of electrical power and thus are not suitable for locations where electrical power is not readily available.

Fourth, some of the previous devices are designed for permanent test capabilities of a fixed piping system and thus are not suitable for portable use in variable locations.

Fifth, many of the previous devices only alert the user to the presence of a leak somewhere along a pipe and thus do not address the problem of identifying the location of a leak.

Sixth, one of the previous devices is designed to test if fuel piping systems are experiencing a leak and thus are not suitable for general purpose fluid piping systems.

Seventh, none of the previous devices allow for the repair of the pipe leak as accessed from the inside of the pipe from a remote location.

Consequently, a need has therefore been felt for an improved but less complex mechanism that allows for a pipe leak location detecting apparatus and repair method.

SUMMARY OF THE INVENTION

It is therefore an object of the present invention to provide an improved pipe leak location detecting apparatus and repair method.

It is therefore another object of the present invention to provide for an improved pipe leak location detecting apparatus and repair method that allows for the rapid location identification of underground pipe leaks as well as above ground pipes in inaccessible or confined locations.

It is yet another object of the present invention to provide for an improved pipe leak location detecting apparatus and repair method that allows the user to determine the severity of said leak in the quantity of gallons per minute.

It is yet another object of the present invention to provide for an improved pipe leak location detecting apparatus and repair method that allows for remote fixing of a leak by use of a sealant compound mixed with water.

Briefly described according to the preferred embodiment of the present invention, the invention constitutes an apparatus that allows for the testing of pipes, either underground or in other inaccessible locations, for leaks. By the use of a ball, attached to a retaining string, traveling through a closed piping system on the flow of liquid that is exiting through the pipe leak, a user is capable of determining the location of the leak within inches, even on long line piping systems. The invention utilizes a reservoir of liquid that is forced through the pipe under test using a pump. A calibrated reel of retaining string then provides the exact location of the leak. The pump and reservoir alone then allow the user to determine the severity of the leak as well as the option of repairing the leak from inside of said piping system from the remote location by use of a sealing compound mixed with water.

An advantage of the present invention is that it is capable of being utilized with no electrical power present by the use of a gasoline engine powered pump or a hand operated pump, thus allowing for the use of the present invention in remote areas where electrical power may not be readily available.

Another advantage of the present invention is that it is simple, and therefore, inexpensive to manufacture. This savings, if passed on to the consumer, may influence the public to utilize such a device. A simple design also increases product reliability and useful product lifetime.

Another advantage of the present invention is that it rapidly identifies the exact location of a leak, thus requiring only a minimal amount of excavating, on an underground pipe, should the user wish to permanently repair the pipe using conventional means from the exterior of the pipe.

Another advantage of the present invention is that it is portable in nature and readily installed on any piping system requiring testing. The minimal amount of materials and components allow it to be easily stored, erected and moved from location to location.

Another advantage of the present invention is that it is easily produced from readily available materials using known manufacturing techniques, thus allowing for an economical and practical product.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
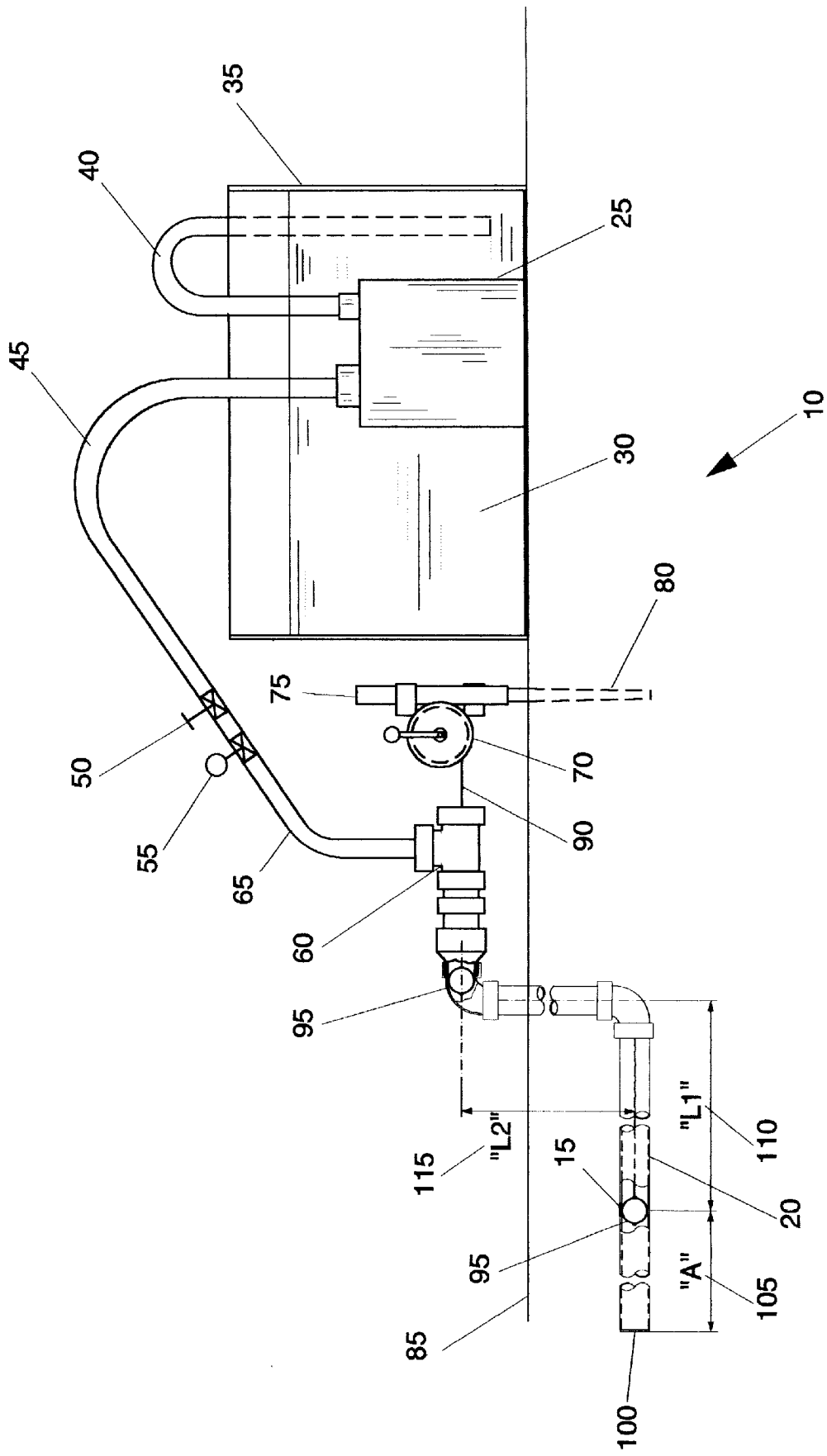
FIG. 1 is a pictorial elevation view of the pipe leak location detecting apparatus and repair method shown in a utilized state for determining the exact location of a leak in a piping system according to the preferred embodiment of the present invention.

Referring now to FIG. 1, a pictorial elevation view of the pipe leak location detecting apparatus and repair method 10 is shown in a utilized state for determining the exact location of a leak 15 in a pipe 20 according to the preferred embodiment of the present invention. A pump 25 is supplied with a constant supply of water 30 from a fluid storage means 35 via an intake supply connection 40. It is envisioned that the pump 25 would be of an electrically powered nature, though it can be seen by those familiar in the art, that a gasoline powered or hand powered pump could also be utilized. An output supply connection 45 is routed through a valve 50 and a pressure gauge 55 where it connects to a coupling adapter 60 via a coupling hose connection 65. The coupling adapter 60 will be explained in greater detail hereinbelow. It is envisioned that the intake supply connection 40, the output supply connection 45, and the coupling adapter 60 are of a flexible nature to aid in the hookup of the pipe leak location detecting apparatus and repair method 10 during testing and repair procedures. A retractable string reel 70, equipped with a hand crank 75 is fastened via a stake 80 to a finished grade 85. While a stake 80 is shown for illustrative purposes, it is envisioned that alternate fastening means such as a clamp or spring could also be utilized in indoor or enclosed environments. While an underground installation of the pipe 20 is shown for illustrative purposes under the finished grade 85, it should be noted that any pipe in any inaccessible location could also be tested in this procedure as well as any following procedures. A retaining string 90 is payed off of the retractable string reel 70 and connected via its opposing end to a ball 95, whose outer diameter is just slightly smaller than the inner diameter of the pipe 20. The connection of the ball 95 will be explained in greater detail hereinbelow. The opposing end of the pipe 20 is closed, either by a valve (not shown) or a temporary cap 100, to allow for a section of pipe "A" 105 with no flow conditions. This no flow condition is what causes the ball 95 to stop at the leak 15 when propelled by a flow from the pump 25. The total length of retaining string 90 deployed when the ball 95 stops moving is what allows the user to determine the exact location of the leak 15. The location of the leak 15 is dictated by an addition of the lengths as presented by a section of pipe "L1" 110 and a section of pipe "L2" 115.

Figure 2:
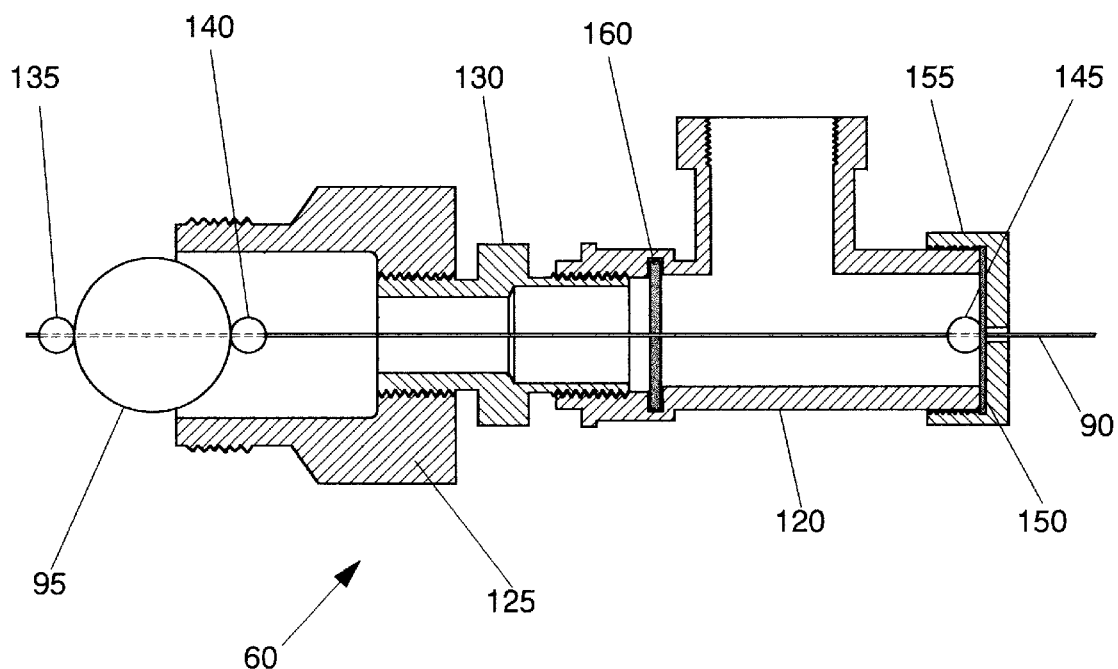
FIG. 2 is detailed cross sectional view of the adapter fitting as used on the one end of the piping system undergoing leak testing.

Referring next to FIG. 2, a detailed cross sectional view of the coupling adapter 60 as used on the one end of the leak 15 undergoing leak testing procedure is disclosed. The coupling adapter 60 comprises two main parts, a "tee" connection 120 and a pipe adapter 125, which are joined together by a pipe fitting 130. The "tee" connection 120, the pipe adapter 125 and the pipe fitting 130 are envisioned to be made from a cast metal and machined to allow joining, but it should be noted that other components such as plastic could also be utilized. The ball 95 is fastened to the retaining string 90 by means of an outside ball bead 135 and an inside ball bead 140 located fore and aft respective to the ball 95. A stop ball bead 145 is located back on the retaining string 90, where it contacts a first seal 150. The purpose of the stop ball bead 145 is to prevent damage to the ball 95, the outside ball bead 135 and the inside ball bead 140 when retracting the retaining string 90 via use of the retractable string reel 70 (not shown in this FIG.) The first seal 150 possesses a small inner diameter opening such that it may pass the retaining string 90, but not any of the liquid contained within the body of the coupling adapter 60. The first seal 150 is retained via a retaining cap 155. Finally, a second seal 160 is used to aid in the seal between the "tee" connection 120 and the pipe fitting 130. The second seal 160 possesses an inner diameter opening such that it may pass the stop ball bead 145.

Figure 3:
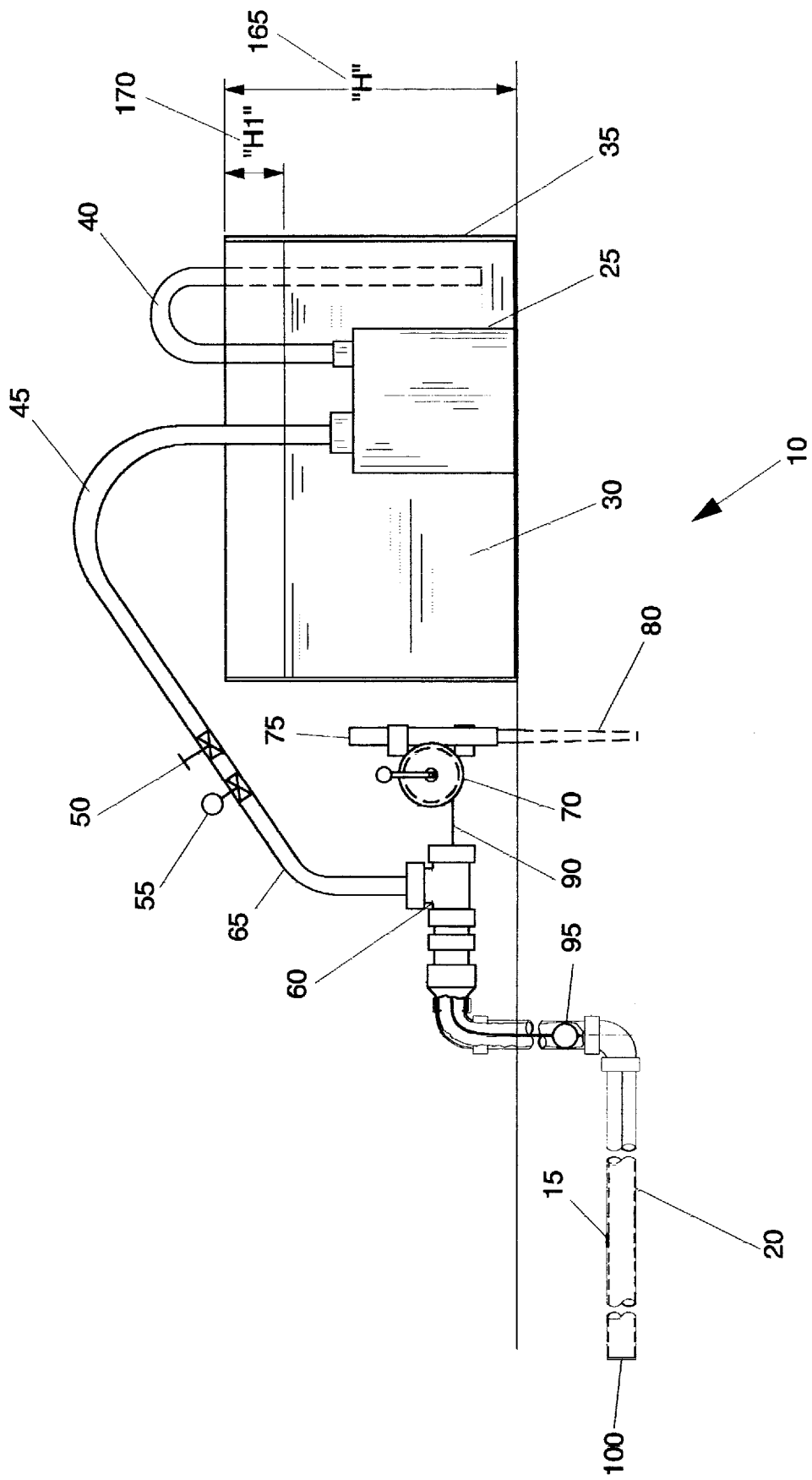
FIG. 3 is a pictorial elevation view of the pipe leak location detecting apparatus and repair method shown in a utilized state for determining the severity of the pipe leak in a gallons per minute ratio.

Referring now to FIG. 3, a pictorial elevation view of the pipe leak location detecting apparatus and repair method 10 is shown in a utilized state for determining the severity of the pipe leak in a gallons per minute ratio. The severity of the pipe leak is simply determined by the amount of time it takes for a predetermined amount of liquid to exit through the leak 15 in the pipe 20. The pipe leak location detecting apparatus and repair method 10 is coupled to the pipe 20 under testing by hooking up the pump 25, the fluid storage means 35, the water 30, the intake supply connection 40, the output supply connection 45, the valve 50, the pressure gauge 55 and the coupling hose connection 65 to the coupling adapter 60. The temporary cap 100 remains in place as aforementioned described. The ball 95 is either removed along with its associated retaining string 90 and retractable string reel 70, or it is permitted to travel a short way down the pipe 20 where it will not interfere with the pipe leak severity testing. A reference volume "H" 165 is established in the fluid storage means 35, and via use of an associated differential volume "Hd" 170 and a timing device such as a stopwatch, a flow rate through the leak 15 can be established. The actual sequence of determining this flow rate will be described in greater detail hereinbelow.

Figure 4:
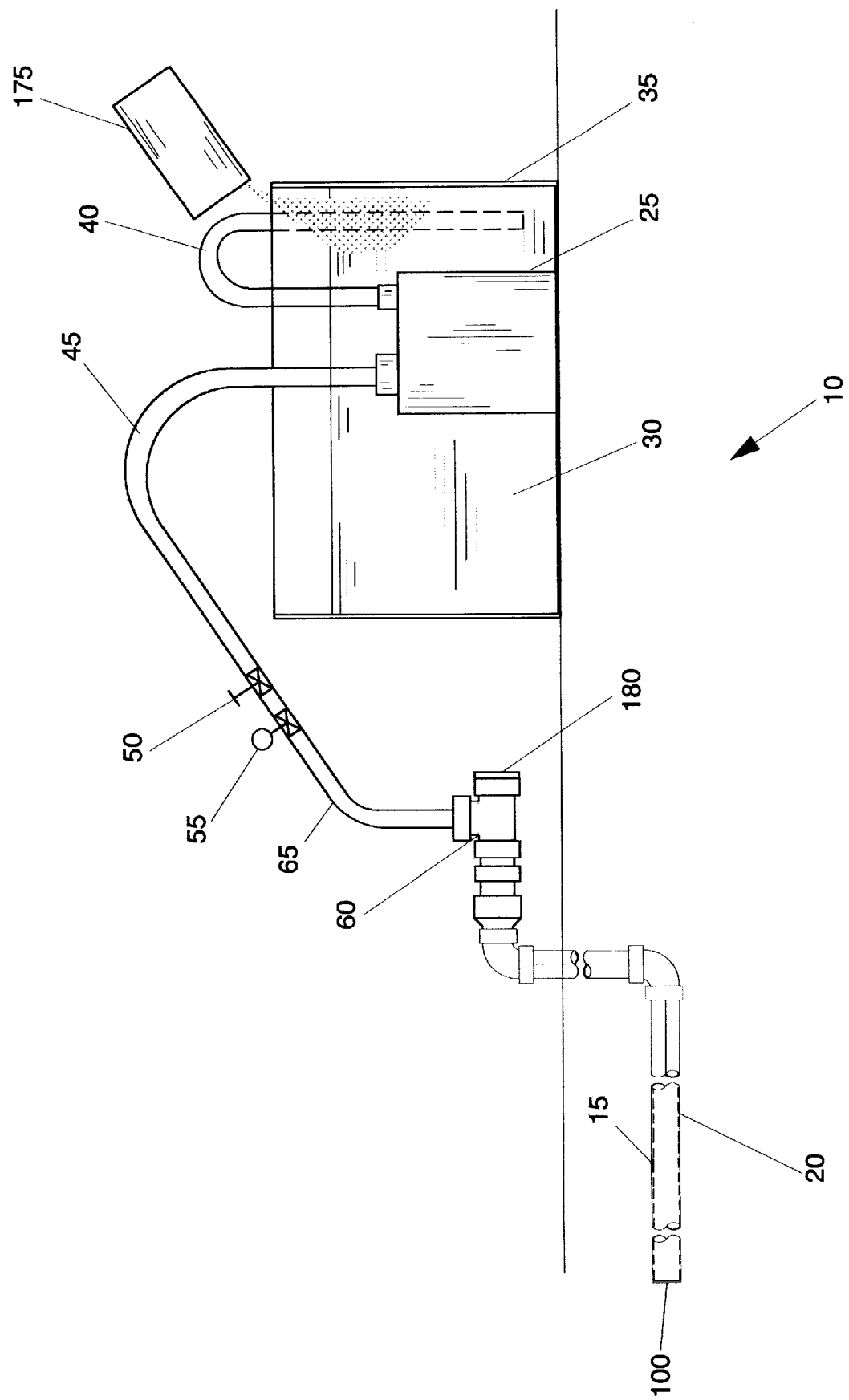
FIG. 4 is a pictorial elevation view of the pipe leak location detecting apparatus and repair method shown in a utilized state for the purposes of repairing the leak as accessed from the interior of the pipe from a remote location using sealing compound mixed with water.

Referring finally to FIG. 4, a pictorial elevation view of the pipe leak location detecting apparatus and repair method 10 is shown in a utilized state for the purposes of repairing of the leak 15 in the pipe 20 as accessed from the interior of the pipe 20 from a remote location using a sealant 175 mixed with the water 30. The sealant compound 175 is of the type generally available to stop leaks and is mixed either in a powder or liquid form in the fluid storage means 35. The pipe leak location detecting apparatus and repair method 10 is coupled to the pipe 20 under repair by hooking up the pump 25, the fluid storage means 35, the water 30, the intake supply connection 40, the output supply connection 45, the valve 50, the pressure gauge 55 and the coupling hose connection 65 to the coupling adapter 60. The temporary cap 100 remains in place as aforementioned described. The ball 95 (not shown in this FIG.) is removed. The associated first seal 150 (not shown in this FIG.) is also removed and replaced with a solid cap 180. The actual sequence of repairing the leak 15 in the pipe 20 will be described in greater detail hereinbelow.

2. Operation of the Preferred Embodiment

In operation, the present invention can be easily utilized by the common user in a simple and effortless manner. To use the present invention with its preferred embodiment can best be described in conjunction with the pictorial elevation views of FIG. 1, FIG. 3 and FIG. 4. and the sectional view of FIG. 2.

The user could begin the utilization of the pipe leak location detecting apparatus and repair method 10 by determining the exact location of the leak using a configuration best detailed by FIG. 1. After all components are properly hooked up, the leak location detecting procedure would take place. First, the retaining string 90 is retracted until the stop ball bead 145 contacts the first seal 150. Second, the fluid storage means 35 is filled with water 30. Third, the pump 25 is activated and the valve 50 is adjusted until the working pressure of the pipe is reached on the pressure gauge 55. The user must remember to continue to refill the fluid storage means 35 with water 30 as necessary throughout the entire process. The ball 95 will be carried by the water 30 flowing out the leak 15 while pulling the retaining string 90, as payed out from the retractable string reel 70 behind. The ball 95 will stop at the leak 15 at a distance defined by the addition of section of pipe "L1" 110 and section of pipe "L2" 115. The ball 95 will stop at the leak 15 because the water flow stops there also. Fourth, after the ball 95 stops, the user will stop the pump 25, close the valve 50, and grasp the retaining string 90 at the retaining cap 155. The user then pulls the ball 95 out until the stop ball bead 145 contacts the first seal 150. It should be noted that the length of the retaining string 90 pulled out equals the distance defined by the section of pipe "L1" 110 and the section of pipe "L2" 115. If there is more than one leak 15, the discovered distance will be to the farthest leak.

The user could then sequentially discover the severity of the leak or could perform this sequence first in lieu of discovering the location of the leak as described above and configured as in FIG. 3. To discover the severity of the leak, the user would first either remove the ball 95 and its associated components as aforementioned described, or allow the ball 95 to travel at least twelve inches down the pipe 20 so as to not interfere with the testing process. Next, the pump 25 is started and by adjusting the valve 50, a working pressure is developed in the pipe 20 as determined by the pressure gauge 55. Next, by use of a timing device such as a stopwatch, it is determined how long it takes for a predetermined amount of water, such as a gallon, as measured by use of the reference volume "H" 165 and the differential volume "Hd" 170 to pass through the pipe 20 with its associated leak 15. As an example, if it takes 15 seconds for a gallon of water to be dispensed, either while maintaining a constant level, or by use of the differential volume "Hd" 170, there is 1(gallon)×60 (sec/min.) /15 (sec) or a 4 gallon per minute leak.

At this point the user has the option of repairing the leak 15 in a conventional manner, either by excavation, or by accessing the enclosed pipe 20. The user also has the option of performing a repair as accessed form inside the pipe 20 as configured in FIG. 4. First, the fluid storage means 35 would be filled with water 30 as mixed with the sealant compound 175 according to the manufacturer's instructions. Second, the pump 25 would be started and the valve 50 adjusted until a reading of five pounds per square inch is obtained on the valve 50. Third, while continuing to add water 30 mixed with sealant 175 in the fluid storage means 35, continue to register five pounds per square inch on the valve 50 by using the valve 50 until the leak 15 is sealed. The above two steps would be repeated using increments of five pounds per square inch until a pressure five pounds per square inch above the working pressure of the pipe 20 is reached and the leak 15 is sealed. Next, the pump 25 is stopped, the valve 50 closed and a waiting period of 36 hours for the sealant 175 to cure commences. At the end of this duration, the pipe 20 is ready to return to normal use, free from leaks.

The foregoing description is included to illustrate the apparatus, method and operation of the preferred embodiment and is not meant to limit the scope of the invention. The spirit and scope of the invention is to be limited only by the following claims.

The invention claimed is:

1. A pipe leak location detecting apparatus for determining the exact location of a leak in a pipe, said apparatus comprising:

fluid storage means, said fluid storage means including an intake supply connection;

a pump, said pump for supplying a constant supply of water from said fluid storage means via said intake supply connection;

an output supply connection;

a coupling adapter;

a pressure gauge, in fluid communication with said coupling adapter;

a retractable string reel containing stored string and having a hand crank fastened to a finished grade of earthen surface;

and wherein when a retaining string is payed off of the retractable string reel during a time period and connected via its opposing end to a ball disposed within said pipe in such manner that the ball is free to move along pipe according to any fluid flow therein, with ball whose outer diameter is just slightly smaller than the inner diameter of the pipe and the opposing end of the pipe, to allow for a section of pipe with a no flow condition formed beyond the lead location, said no flow condition is thereby created and causes the ball to stop at the leak when propelled by a flow from the pump.

2. The pipe leak location detecting apparatus of claim 1, wherein the total length of retaining string deployed during the time period until when the ball stops moving allows the user to determine the exact location of the leak.

3. The pipe leak location detecting apparatus of claim 1, wherein said section of analyzed pipe is isolated by an isolation means selected from the group comprising a valve and a temporary cap.

4. The pipe leak location detecting apparatus of claim 1, wherein said pump is of an electrically powered nature.

5. The pipe leak location detecting apparatus of claim 1, wherein said pump is a gasoline powered.

6. The pipe leak location detecting apparatus of claim 1, wherein said pump is a manual hand cranked pump.

7. The pipe leak location detecting apparatus of claim 1, wherein said coupling adapter as used on the one end of the pipe leak undergoing leak testing procedure as disclosed comprises two main parts, a "tee" connection and a pipe adapter joined together by a pipe fitting, and wherein said "tee" connection, said pipe adapter and said pipe fitting are formed of cast metal and machined to allow joining.

8. The pipe leak location detecting apparatus of claim 1, wherein said ball is fastened to said retaining string by an outside ball bead and an inside ball bead located fore and aft respective to said ball, and said ball further comprises a stop ball bead located back on the retaining string, where it contacts a first seal such that said stop ball bead prevents damage to the ball, the outside ball bead and the inside ball bead when retracting the retaining string via use of the retractable string reel.

* * * * *